United States Patent [19]

Stokes

[11] Patent Number: 5,711,543
[45] Date of Patent: Jan. 27, 1998

[54] TRAILER ATTACHMENT APPARATUS

[76] Inventor: Jacque Stokes, 22561 Blue Teal Dr., Canyon Lakes, Calif. 92587

[21] Appl. No.: 595,392

[22] Filed: Feb. 1, 1996

[51] Int. Cl.⁶ ........................................ B60D 1/00
[52] U.S. Cl. ........................... 280/504; 280/495; 224/570
[58] Field of Search ............................. 280/495, 497, 280/498, 499, 500, 501, 504, 769, 304.5, 79.2, 79.5, 483; 224/553, 570, 410, 274; 56/16.3, 14.7

[56] References Cited

U.S. PATENT DOCUMENTS

| | | | |
|---|---|---|---|
| 1,398,547 | 11/1921 | Graham | 280/504 |
| 2,248,170 | 7/1941 | Hansen | 224/570 |
| 2,439,623 | 4/1948 | Howells | 224/570 |
| 3,237,968 | 3/1966 | Arsenault | 280/504 |
| 4,721,324 | 1/1988 | Blacklaw | 280/504 |
| 4,730,841 | 3/1988 | Ponder | 280/501 |
| 5,647,604 | 7/1997 | Russel | 280/504 |

*Primary Examiner*—Brian L. Johnson
*Assistant Examiner*—Gary Savitt
*Attorney, Agent, or Firm*—John R. Duncan; Frank D. Gilliam

[57] ABSTRACT

A connection apparatus for connecting a vehicle to a wheeled container for towing the container including a handle having at least a portion lying generally parallel to the container wheel axle. The apparatus is connected to the vehicle in a manner permitting the container to pivot and to roll slightly so as to track well during towing. A channel is formed between an elongated angle and one or more angular brackets for receiving the container handle. A clamping device is movable between positions closing the open side of the channel to clamp the handle in the channel and an open position for removal of the handle. The channel is adjustable in width and height and the angular bracket positions are adjustable to accommodate various handle shapes. A releasable locking device is provided to lock the channel closed around the handle during towing. The locking and clamping devices are adjustable to accommodate various handle heights and shapes. The apparatus is thus adaptable to almost any handle configuration.

16 Claims, 3 Drawing Sheets

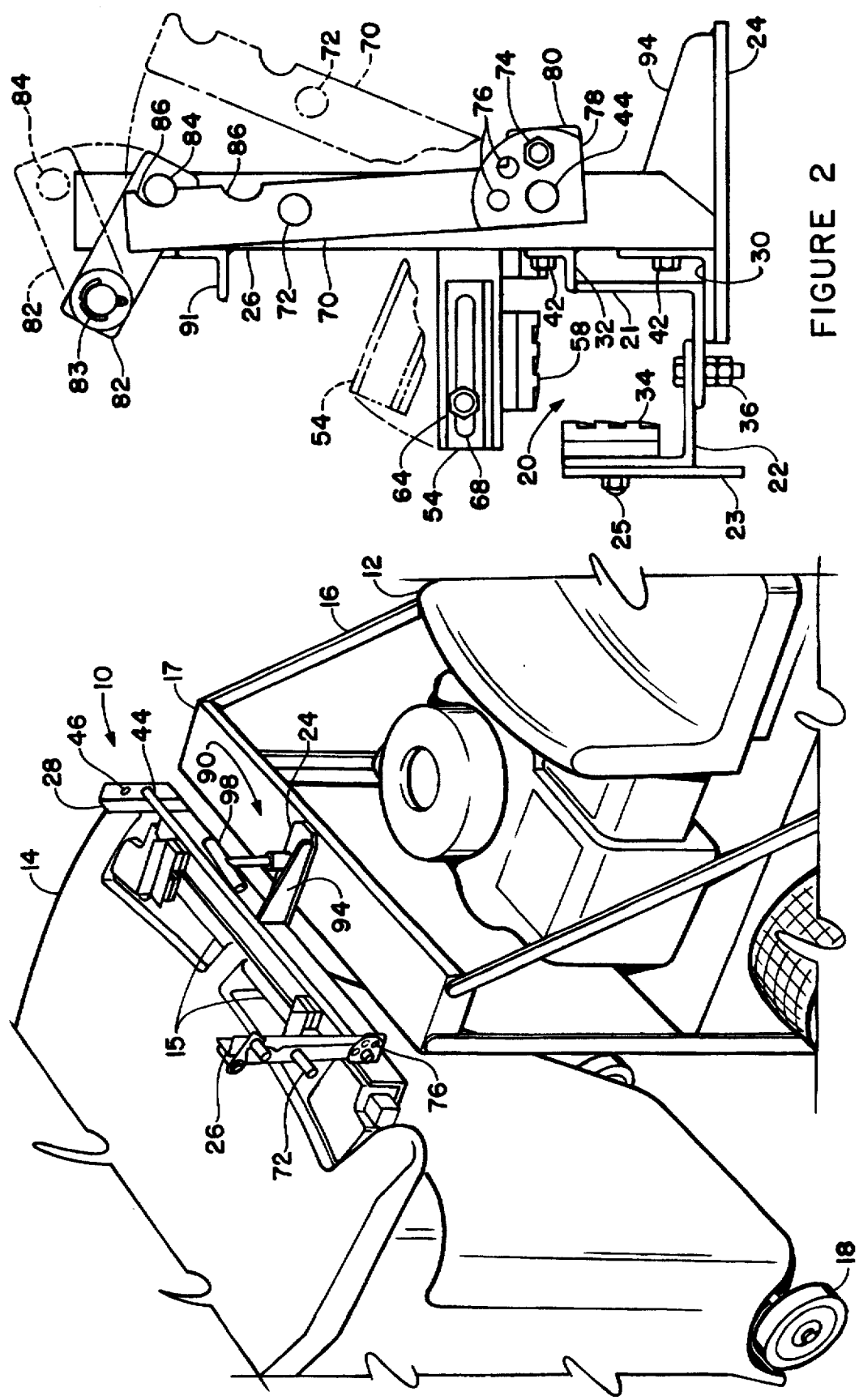

TRAILER ATTACHMENT APPARATUS

BACKGROUND OF THE INVENTION

This invention relates in general to apparatus for connecting a vehicle to a rolling trailer and, more specifically, to a versatile and easily connectable and disconectable attachment for connecting a small vehicle such as a garden tractor to a large wheeled trash bin or the like.

People who live on large lots in rural or suburban locations often must place trash bins for pickup at a main road that may be hundreds of yards or further from their homes. Generally, large trash bins having wheels and a handle for moving them are used. Moving them by hand can be very difficult, especially when they are filled with heavy material and must be moved up and/or down hill.

Other wheeled containers must be moved in other circumstances. For example, in many primitive campgrounds, liquid wastes from a trailer or other recreational vehicle must be collected at the trailer and delivered to a dump station at some distance from the campsites, often up or down hill. Since it is often inconvenient to move the recreational vehicle itself to the dump station, many people use large, often 25 gallon or larger, plastic tanks on wheels to collect the liquid waste, with the tank then manually moved to the dump station. Again, manually moving heavy wheeled tanks over rough terrain can be very difficult.

Similarly, small businesses, toxic waste collection stations, etc. often need to move containers for solid or liquid waste or for incoming material around the site to collect or deliver materials. Manual movement of the containers is often difficult.

The different types of trash bins, liquid receptacles, etc. have handles for use in moving them, generally including a handle bar arranged near the upper front edge of the container and parallel to the axis of rotation of the wheel system. However, the handles vary in diameter, length, etc.

Therefore, there is a continuing need for apparatus and methods for connecting such containers to small powered vehicles to permit easy, safe and convenient container movement, that can easily be releasably connected to the vehicle and container, that provide positive connection and can accommodate a wide variety of container handle configurations.

SUMMARY OF THE INVENTION

The above-noted problems are overcome, and needs met, by a connection apparatus which includes a universal pin connector for connection to a small vehicle such as a garden tractor, electric golf cart, all terrain vehicle or the like and which includes means for clamping around any of a variety of container handle configurations. The apparatus is connected to the vehicle, the container handle is brought into engagement with the apparatus, clamped in place and releasably locked. The vehicle is driven to the desired location, the lock is released and the vehicle can depart. The connection apparatus can be left attached to the vehicle (or container) or may be removed for easy reinstallation when again needed.

Basically, the apparatus comprises an upwardly-opening channel member for receiving a container handle, a pivotable closure means moveable from an open position away from the channel to a closed position closing the open side of the channel member and clamping the handle securely within the channel. A lock means is preferably provided for releasably locking the closure means in the closed position. An attachment means is provided for releasably attaching the apparatus to a vehicle while permitting the container to swivel and twist to track well behind the moving vehicle.

Means are provided for adjusting the width of the channel member, the distance of the closure means from the channel both perpendicular to the channel opening and parallel thereto, the angle of the closure means relative to the channel, the width of one side of the channel member and the width of the closure means relative to the handle length. These multiple adjustments permit the apparatus to be used with a very wide variety of wheeled containers having a handle having at least a portion generally parallel to the wheel axle.

BRIEF DESCRIPTION OF THE DRAWING

Details of the invention, and of preferred embodiments thereof, will be further understood upon reference to the drawing, wherein:

FIG. 1 is a perspective view of the connection apparatus, including portions of a container and vehicle;

FIG. 2 is a side elevation view of the connection apparatus;

DETAILED DESCRIPTION OF PREFERRED EMBODIMENTS

Figure 3:
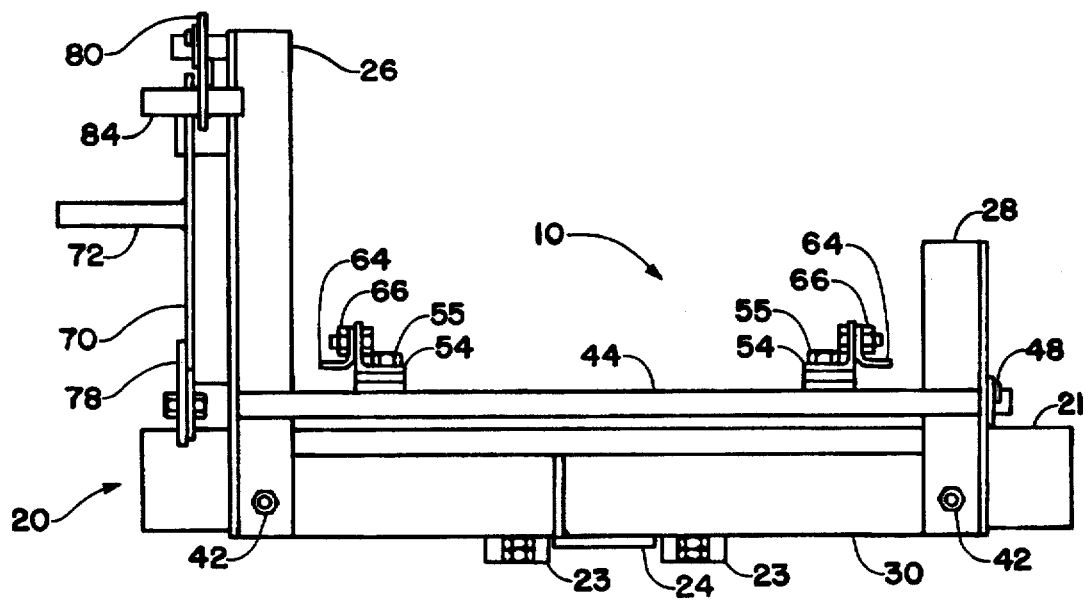
FIG. 3 is a front elevation view of the connection apparatus.

Referring to FIG. 1, the connection apparatus 10 of this invention is seen connected to a vehicle 12 and a wheeled container 14. Any suitable vehicle, such as a garden tractor, golf cart, all-terrain vehicle, etc. may have a connection apparatus 10 mounted thereon. Connection to the vehicle may be made to any rear horizontal surface. Where no such surface is available, a simple bracket 16 having a horizontal plate 17 and a bar assembly welded or bolted to the vehicle may be used.

Any suitable wheeled container 14, having two or more wheels 18, may be towed by vehicle 12 using the connection assembly 10. Typical containers include trash bins of the sort shown, recreational vehicle waste water tanks, equipment trailers, etc. A handle 15 on container 14 engages connection apparatus 10.

As seen in FIGS. 2–6, connection apparatus 10 basically includes a channel member 20 formed by metal angle 21 and at least one angular bracket 22. While in most cases two angular brackets 22, as shown, will be preferred, a single bracket or more than two may be used, if desired. Angle 21 is secured to a reinforcing angle 30 that is mounted on central baseplate 24, which extends over vehicle plate 17 for connection to the vehicle. These connections may be made in any suitable manner, such as by welding, bolts or the like.

A first upright 26 and a second upright 28 are also fastened to angle 30 near opposite ends thereof. While angle 21 may be fastened directly to baseplate 24, for optimum strength intermediate metal angle 30 and spacer angle 32 may be used to further secure angle 20 and uprights 26 and 28 into a rigid structure with baseplate 24.

Figure 4:
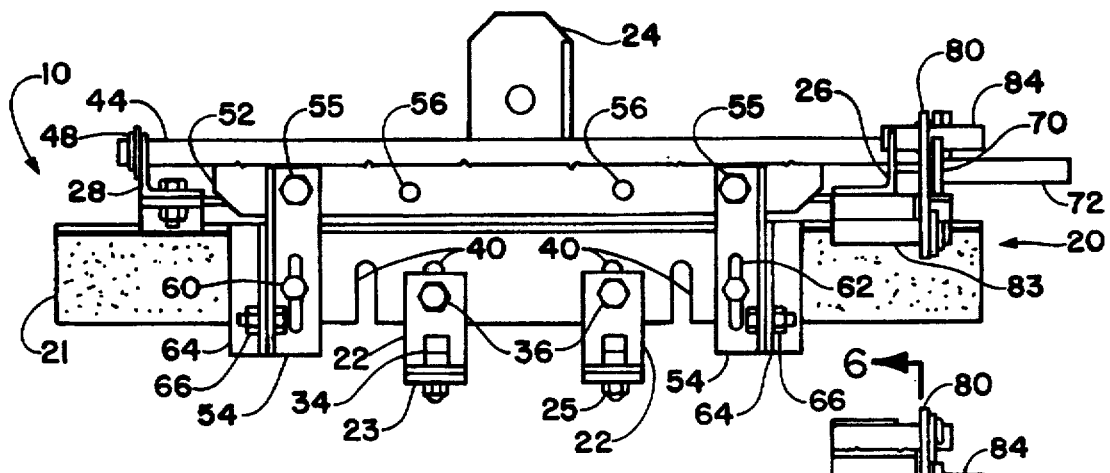
FIG. 4 is a plan view of the connection apparatus.
Figure 5:
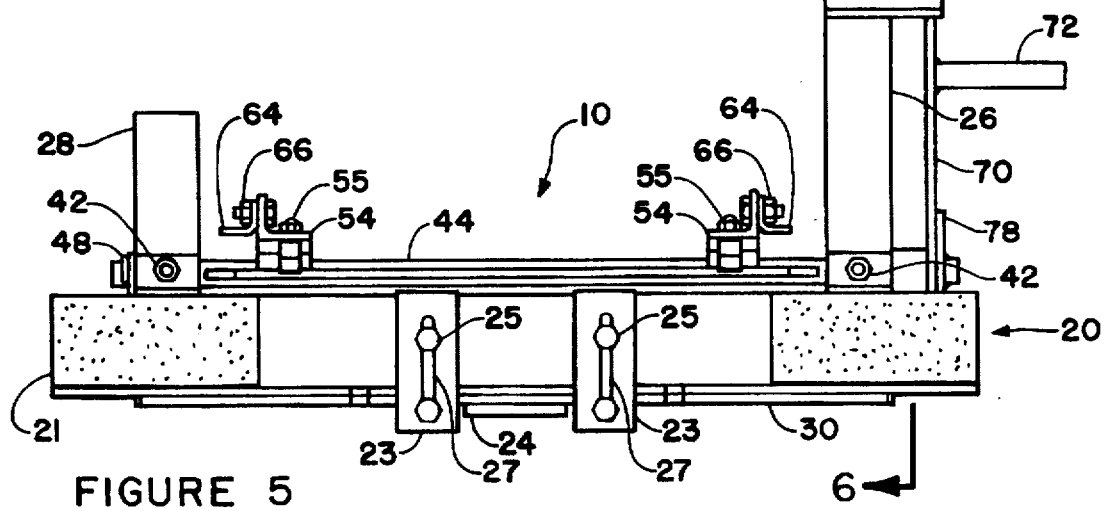
FIG. 5 is a back elevation view of the connection apparatus.

Angular brackets 22 each includes a pad 34 of resilient material held to the bracket by bolt 25 that is adjustable along slot 27, as best seen in FIG. 5. Each angular bracket 22 is secured at the desired location in one of slots 40 along channel angle 21 (as best seen in FIG. 4), by a bolt 36, thus being adjustable in location and perpendicular to the length of channel member 20 to adjust channel width. Preferably plates 23 are secured to angular brackets 22 by bolts 25 through slots 27.

Uprights 26 and 28 are each fastened to angles 30 and 32 (FIG. 2) by a pair of bolts 42. A rod 44 is rotatably fitted through holes 46 in uprights 26 and 28. Preferably, two or more pairs of holes 46 (as seen in FIG. 1 and in the section view of FIG. 7) are provided through uprights 26 and 28 so that different heights for rod 44 may be selected.

A narrow plate 52 (FIG. 4) is secured, such as by welding, to rod 44. At least one clamping bracket 54 is releasably fastened by a bolt 55 to a selected hole 56 in plate 52, as best seen in FIG. 4. While generally two equally spaced clamping brackets 54, as shown, are preferred, any other arrangement of these components, optimized for a particular container handle configuration, may be used.

Each clamping bracket 54 includes a resilient, handle-clamping, pad 58 secured to the bracket by a bolt 60 selectively positioned along a slot 62. A small metal angle 64 is mounted on each clamping bracket 54 by a bolt 66 passing through an adjustment slot 68 (as best seen in FIG. 2), in order to extend the length of bracket 54 where desirable to accommodate an unusual handle configuration.

The end of rod 44 extends through a corresponding hole in bracket 44. A handle 72 secured to bracket 70 permits rod 44 and clamping brackets 54 to be rotated from the position shown in solid lines to the position shown (FIG. 2) in broken lines and beyond, to open channel 20 for insertion of container handle 15 into the channel. A bolt 74 extends through one of adjustment holes 76 in plate 78, welded to the end of rod 44. Bolt 74 also passes through a hole in extension 80 on bracket 70, as best seen in FIG. 2, to selectively lock bracket 70 at a selected angle to rod 44. In combination with the selected holes 46 (FIG. 1) in uprights 26 and 28, the selection of a particular hole 76 in bracket 78 (FIG. 2) will result in clamping bracket 54 lying horizontal or angling up or down relative to channel 20.

Figure 6:
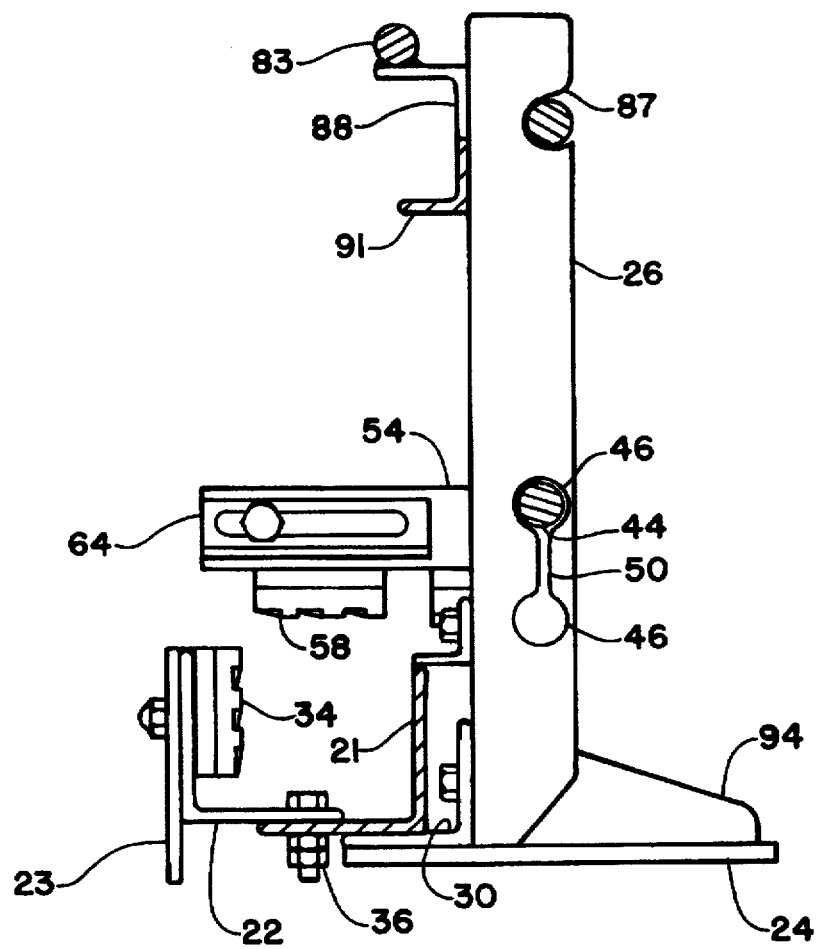
FIG. 6 is a section view taken on line 6—6 in FIG. 5.

In order to move rod 44 from one pair of holes 46 to the other, a slot 50 is provided between holes 46 in first upright 26 as seen in FIG. 6. Clamping brackets 54 are unbolted from plate 52, cotter pin 48 is removed and bracket 70 is rotated clockwise as seen in FIG. 2 until plate 52 aligns with slot 50, so that the assembly of rod 44 and plate 52 can be withdrawn. That assembly is inverted and rod 44 is inserted into the other hole 46 (FIG. 6) with the plate 52 passing again passing through slot 50. Cotter pin 48 is reinstalled in the end of rod 44 and the connection apparatus is ready to accommodate a different handle 15 configuration.

A locking mechanism, as best seen in FIG. 2, is provided to lock clamping bracket 54 in the handle clamping position. A bar 82 is pivotally mounted on art axle 83, secured by cotter pin 85, at one end of an angular extension 88 fastened to first upright 26, as best seen in FIGS. 2 and 6. A pin 84 at the second end of bar 82 acts as a handle to move the handle into a notch 86 in bracket 70 to lock the bracket (and clamping bracket 54 carried thereby) in place. The second end of pin 84 is received in a notch 87 in first upright 26, as seen in FIG. 6. A backing plate or angle 91 acts as a stop for bracket 70 in the locked position, as seen in FIG. 2.

Bracket 70 and integral bracket 54 are released to open channel 20 by pulling handle pin 84 away from a notch 84. One of the two notches 84 will fit pin 84, depending upon which hole 46 contains rod 44.

Figure 7:
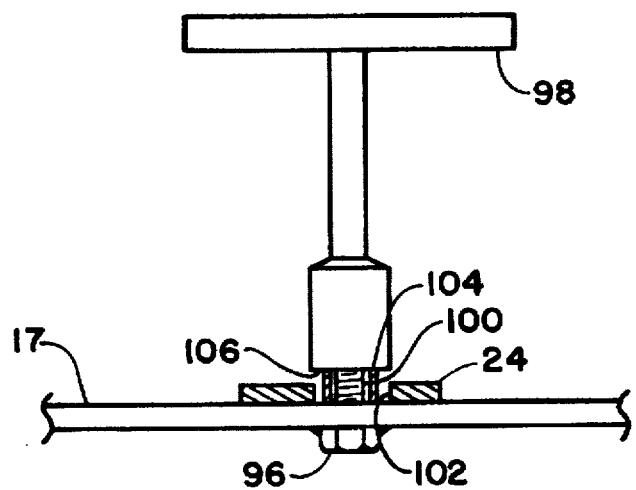
FIG. 7 is a detail view, partially in axial section, of the means for securing the connection apparatus to a tow vehicle.

As seen in FIGS. 1 and 7, a bracket assembly 90 is provided for flexibly securing connection apparatus 10 to plate 17 of bracket 16 on the tow vehicle. A reinforcement 94 is secured to metal angle 30 and to baseplate 24 by welding or the like. Assembly 90 may include any suitable means for connection to bracket 16 that permits swiveling in a horizontal plane and a reasonable amount of twist as the container is towed. Preferably, a nut 96 is welded to the underside of plate 17 in alignment with a hole in the plate. If desired, a threaded aperture could be formed directly in plate 17 in place of nut 96. A T-handle 98 has a bolt or stud 100 extending therefrom for threading through baseplate 24 into nut 96. Hole 102 through baseplate 24 is oversized, so that a sleeve 104 can loosely fit within hole 102 around bolt 100. Thus, when T-handle 98 tightly threads bolt 100 into nut 96, a face 106 encounters sleeve 104. This arrangement permits connection assembly 10 to pivot about the vertical axis formed by sleeve 104 during towing, with the space between face 106 and baseplate 24 allowing the container to roll or twist somewhat during towing. The threaded end of bolt 100 has a diameter less than the diameter of bracket hole 102.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. Apparatus for connecting a wheeled container to a vehicle which comprises:

a channel member having a first open side for receiving a wheeled container handle;

said channel member has first and second opposite vertical walls, a horizontal base portion and said first open side and comprises an elongated angle section forming the first vertical wall and a part of said horizontal base portion and at least one angular bracket forming the second vertical wall and a part of said horizontal base portion;

connection means between said elongated angle section and said at least one angular bracket for adjusting distance between said first and second vertical walls;

attachment means secured to said channel member for releasably attaching said channel member to a vehicle;

pivotable closure means movable between a first position closing said first open side for securing a wheeled container handle within said channel and a second position uncovering said open side for entrance and removal of a wheeled container handle;

adjustment means for adjusting the size and configuration of said channel wherein said adjustment means includes a slot in one part of said horizontal base portion and generally transverse to said elongated angle section and a hole in another part of said horizontal base portion alignable with said slot and fastener means extending through said hole and said slot; and locking means for releasably locking said pivotable closure means in said first position.

2. The apparatus according to claim 1 wherein a plurality of said slots are formed in said part of said horizontal base portion formed by said elongated angle section and a hole is formed in said at least one angular bracket so that said at least one angular bracket can be secured at any slot location.

3. The apparatus according to claim 1 further including a resilient pad and means for mounting said resilient pad on said at least one angular bracket wall with said resilient pad extending inwardly of said channel member, said mounting means including means for varying distance between said resilient pad and the part of said horizontal base portion formed by said angular bracket.

4. The apparatus according to claim 1 wherein said closure means comprises at least one resilient pad and further includes means for positioning said pad at different locations transverse to said channel member.

5. The apparatus according to claim 4 further including means for positioning said pad at different locations longitudinal of said channel member.

6. The apparatus according to claim 4 further including means for positioning said pad at different distances from said horizontal base portion.

7. The apparatus according to claim 4 further including means for positioning said pad at different angles to said horizontal base portion.

8. The apparatus according to claim 1 wherein said means for releasably attaching said channel member to a vehicle comprises:

a plate secured to a vehicle;

said plate including a threaded aperture;

a plate secured to said channel member and having a plate hole larger than said said threaded aperture and alignable therewith;

manually rotatable means having a threaded extension sized to thread into said threaded aperture;

a sleeve around said threaded extension, having a diameter greater than said threaded extension and less than said plate hole;

a face on said turning means for engaging said sleeve when said threaded extension is threaded into said threaded hole;

whereby said vehicle and channel member are secured together while permitting relative pivoting about said threaded extension and allowing said channel member to roll to a predetermined degree relative to said vehicle.

9. Apparatus for connecting a wheeled container to a vehicle which comprises:

a channel member having a first open side for receiving a wheeled container handle;

said channel member has first and second opposite vertical walls, a horizontal base portion and said first open side and comprising an elongated angle section forming a first vertical wall and a part of said horizontal base portion and at least one angular bracket forming a second vertical wall and a part of said horizontal base portion, means for connecting said elongated angle section and said angular bracket together to form a channel and means for varying distance between said first and second vertical walls;

adjustment means for adjusting the size and configuration of said channel wherein said adjustment means includes a slot in one part of said horizontal base portion and generally transverse to said elongated angle section and a hole in another part of said horizontal base portion alignable with said slot and fastener means extending through said hole and said slot;

attachment means secured to said channel member for releasably attaching said channel member to a vehicle, said attachment means including means for permitting said channel member to pivot relative to said vehicle and to roll to a predetermined degree relative to said vehicle;

pivotable closure means movable between a first position closing said first open side for securing a wheeled container handle within said channel and a second position uncovering said open side for entrance and removal of a wheeled container handle; and locking means for releasably locking said pivotable closure means in said first position.

10. The apparatus according to claim 9 wherein a plurality of said slots are formed in said part of said horizontal base portion formed by said elongated angle section and a hole is provided in said at least one angular bracket so that said at least one angular bracket can be secured at any slot location.

11. The apparatus according to claim 9 further including a resilient pad and means for mounting said resilient pad on said at least one angular bracket wall with said resilient pad extending inwardly of said channel member, said mounting means including means for varying distance between said resilient pad and the part of said horizontal base portion formed by said angular bracket.

12. The apparatus according to claim 9 wherein said closure means comprises at least one resilient pad and further includes means for positioning said resilient pad at different locations transverse to said channel member.

13. The apparatus according to claim 12 further including means for positioning said pad at different locations longitudinal of said channel member.

14. The apparatus according to claim 12 further including means for positioning said pad at different distances from said horizontal base portion.

15. The apparatus according to claim 12 further including means for positioning said pad different angles to said horizontal base portion.

16. The apparatus according to claim 9 wherein said means for releasably attaching said channel member to a vehicle comprises:

a plate secured to a vehicle;

said plate including a threaded aperture;

a plate secured to said channel member had having a plate hole alignable with said threaded aperture and alignable therewith;

turning means having a threaded extension sized to thread into said threaded aperture;

a sleeve around said threaded extension, having a diameter greater than said threaded extension and less than said plate hole;

a face on said turning means for engaging said sleeve when said threaded extension is threaded into said threaded hole;

whereby said vehicle and channel member are secured together while permitting relative pivoting, about said threaded extension and allowing said channel member to roll to a predetermined degree relative to said vehicle.

* * * * *